US012051862B2

(12) United States Patent
Taki et al.

(10) Patent No.: US 12,051,862 B2
(45) Date of Patent: Jul. 30, 2024

(54) ANTENNA UNIT AND WIRELESS COMMUNICATION DEVICE INCLUDING THE SAME

(71) Applicant: Murata Manufacturing Co., Ltd., Kyoto (JP)

(72) Inventors: Shota Taki, Kyoto (JP); Masahiro Izawa, Kyoto (JP); Yasuo Tanbo, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 202 days.

(21) Appl. No.: 17/657,367

(22) Filed: Mar. 31, 2022

(65) Prior Publication Data

US 2022/0224015 A1 Jul. 14, 2022

Related U.S. Application Data

(63) Continuation of application No. PCT/JP2020/037890, filed on Oct. 6, 2020.

(30) Foreign Application Priority Data

Oct. 30, 2019 (JP) ................................ 2019-197528

(51) Int. Cl.
*H01Q 9/40* (2006.01)
*H01Q 5/25* (2015.01)
(Continued)

(52) U.S. Cl.
CPC ................ *H01Q 9/40* (2013.01); *H01Q 5/25* (2015.01); *H01Q 5/364* (2015.01); *H01Q 9/0421* (2013.01)

(58) Field of Classification Search
CPC ..... H01Q 1/36; H01Q 9/0421; H01Q 9/16–43
See application file for complete search history.

(56) References Cited

U.S. PATENT DOCUMENTS 5,774,094 A * 6/1998 Yonezaki ............ H01Q 21/064 343/770
6,853,341 B1 * 2/2005 Hellgren ................. H01Q 9/42 343/742

(Continued)

FOREIGN PATENT DOCUMENTS

JP 2010-263524 A 11/2010
WO 2010/105274 A1 9/2010

(Continued)

OTHER PUBLICATIONS

International Search Report for PCT/JP2020/037890 dated Dec. 22, 2020.

*Primary Examiner* — Ab Salam Alkassim, Jr.
(74) *Attorney, Agent, or Firm* — Pearne & Gordon LLP

(57) ABSTRACT

An antenna unit includes a feed point, a first antenna conductor extending from the feed point and having a width that expands as a distance from the feed point increases, a second antenna conductor facing a top end edge of the first antenna conductor with a gap formed therebetween, a first connection part connecting the top end edge of the first antenna conductor and the second antenna conductor via a capacitor, and a second connection part connecting the top end edge of the first antenna conductor and the second antenna conductor via an inductor or a zero-ohm resistor. A first connection point between the first connection part and the first antenna conductor is closer to a center of the top end edge of the first antenna conductor compared with a second connection point between the second connection part and the first antenna conductor.

9 Claims, 8 Drawing Sheets

(51) Int. Cl.
*H01Q 5/364* (2015.01)
*H01Q 9/04* (2006.01)

(56) References Cited

U.S. PATENT DOCUMENTS

| | | | | |
|---|---|---|---|---|
| 6,917,334 | B2 * | 7/2005 | Chen | H01Q 9/40 343/700 MS |
| 8,717,245 | B1 * | 5/2014 | Krivokapic | H01Q 5/378 343/807 |
| 8,860,617 | B1 * | 10/2014 | Fenick | H01Q 5/40 343/729 |
| 9,019,163 | B2 * | 4/2015 | Asanuma | H01Q 9/28 343/702 |
| 9,077,066 | B1 * | 7/2015 | Lee | H01Q 9/0407 |
| 2005/0099339 | A1 * | 5/2005 | Miyoshi | H01Q 9/40 343/700 MS |
| 2010/0103050 | A1 * | 4/2010 | Shimizu | H01Q 5/321 343/700 MS |
| 2010/0149053 | A1 * | 6/2010 | Nakano | H01Q 1/243 343/702 |
| 2010/0231462 | A1 * | 9/2010 | Tran | H01Q 1/38 343/893 |
| 2010/0315303 | A1 * | 12/2010 | Kearney | H01Q 9/42 343/848 |
| 2011/0057850 | A1 * | 3/2011 | Chen | H01Q 9/0407 343/700 MS |
| 2011/0156971 | A1 * | 6/2011 | Yang | H01Q 5/357 343/729 |
| 2012/0169560 | A1 * | 7/2012 | Lee | H01Q 9/30 343/770 |
| 2013/0057443 | A1 * | 3/2013 | Asanuma | H01Q 5/314 343/751 |
| 2014/0002320 | A1 * | 1/2014 | Asanuma | H01Q 7/00 343/749 |
| 2014/0104129 | A1 * | 4/2014 | Chen | H01Q 1/38 343/850 |
| 2016/0020515 | A1 * | 1/2016 | Jan | H01Q 9/40 343/700 MS |
| 2020/0044342 | A1 * | 2/2020 | Komura | H01Q 9/40 |
| 2020/0335857 | A1 * | 10/2020 | Shoji | H01Q 21/0031 |

FOREIGN PATENT DOCUMENTS

| | | | |
|---|---|---|---|
| WO | 2012/124247 | A1 | 9/2012 |
| WO | WO-2023234436 | A1 * | 12/2023 |

* cited by examiner

ANTENNA UNIT AND WIRELESS COMMUNICATION DEVICE INCLUDING THE SAME

CROSS REFERENCE TO RELATED APPLICATION

This is a continuation of International Application No. PCT/JP2020/037890 filed on Oct. 6, 2020 which claims priority from Japanese Patent Application No. 2019-197528 filed on Oct. 30, 2019. The contents of these applications are incorporated herein by reference in their entireties.

BACKGROUND ART

Technical Field

The present disclosure relates to an antenna unit and a wireless communication device including the antenna unit.

Background Art

For example, the Patent Document 1 discloses a bow-tie antenna whose size is downsized while keeping wideband characteristics thereof. Because each of a pair of antenna conductors has a shape extending in a direction away from a feed point and having the width that expands as the distance from the feed point increases, the bow-tie antenna has wideband characteristics.

Patent Document 1: Japanese Unexamined Patent Application Publication No. 2010-263524

BRIEF SUMMARY

A downsized antenna unit for communicating in a first frequency band having wide band width is desirable to be also usable in a second frequency band, which is another frequency band. That is to say, such a downsized antenna unit is desirable to be dual-band compatible. However, in the case where the second frequency band is a low frequency band compared with the first frequency band, it is required to extend the antenna length in order to become compatible with that second frequency band. As a result, the size of the antenna unit increases.

The present disclosure is to enable an antenna unit communicating in a higher frequency band having wide band width to communicate also in a lower frequency band while suppressing an increase in the size of the antenna unit.

In order to resolve foregoing technical issues, according to one aspect of the present disclosure, there is provided an antenna unit including: a feed point; a first antenna conductor extending from the feed point in a direction away from the ground conductor and having a width that expands as a distance from the feed point increases; a second antenna conductor facing a top end edge of the first antenna conductor with a gap formed therebetween; a first connection part connecting the top end edge of the first antenna conductor and the second antenna conductor via a capacitor; and a second connection part connecting the top end edge of the first antenna conductor and the second antenna conductor via an inductor or a zero-ohm resistor, wherein a first connection point between the first connection part and the first antenna conductor is closer to a center of the top end edge of the first antenna conductor compared with a second connection point between the second connection part and the first antenna conductor.

Moreover, according to a different aspect of the present disclosure, there is provided a wireless communication device including the foregoing antenna unit, and a feed circuit that supplies power to the feed point of the antenna unit.

The present disclosure enables an antenna unit communicating in a higher frequency band having wide band width to communicate also in a lower frequency band while suppressing an increase in the size of the antenna unit.

DETAILED DESCRIPTION

Figure 1:
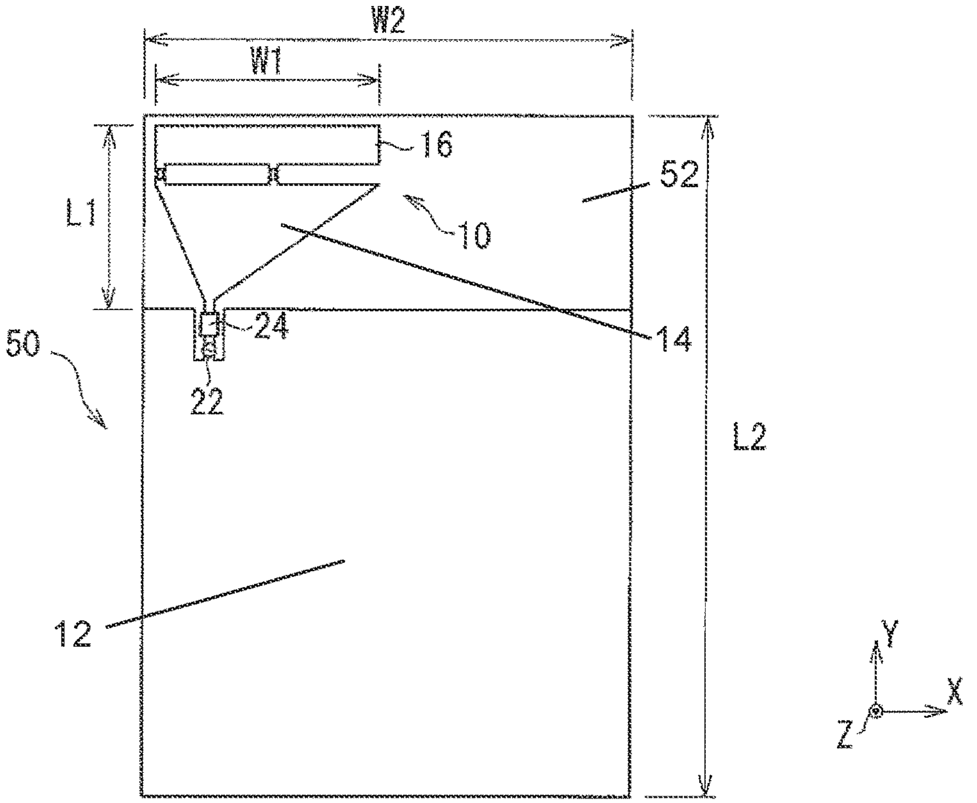
FIG. 1 is a top view of a wireless communication device including an antenna unit according to an embodiment 1 of the present disclosure.

An antenna unit of one aspect of the present disclosure includes a feed point; a first antenna conductor extending from the feed point in a direction away from the ground conductor and having a width that expands as a distance from the feed point increases; a second antenna conductor facing a top end edge of the first antenna conductor with a gap formed therebetween; a first connection part connecting the top end edge of the first antenna conductor and the second antenna conductor via a capacitor; and a second connection part connecting the top end edge of the first antenna conductor and the second antenna conductor via an inductor or a zero-ohm resistor, wherein a first connection point between the first connection part and the first antenna conductor is closer to a center of the top end edge of the first antenna conductor compared with a second connection point between the second connection part and the first antenna conductor.

Such an aspect enables an antenna unit communicating in a higher frequency band having wide band width to communicate also in a lower frequency band while suppressing an increase in the size of the antenna unit.

For example, the first connection point may be positioned at the center of the top end edge of the first antenna conductor, and the second connection point may be positioned at one end of the top end edge of the first antenna conductor.

For example, the antenna unit may further include a ground conductor connected to the feed point. In this case, the first antenna conductor extends in a direction away from the ground conductor.

For example, the antenna unit may further include a short-circuit conductor, one end portion of the short-circuit conductor being connected to the first antenna conductor, another end portion of the short-circuit conductor being connected to the ground conductor. In this case, a third connection point between the short-circuit conductor and the first antenna conductor can be closer to the second connection point than to the first connection point.

For example, the one end portion of the short-circuit conductor may be connected to the first antenna conductor via an inductor, and the another end portion of the short-circuit conductor may be connected to the ground conductor via an inductor.

For example, a width of the second antenna conductor may be equal to or greater than a length of the top end edge.

For example, the first antenna conductor may have a triangular shape whose base is the top end edge, and the second antenna conductor may have a rectangular shape.

For example, the first antenna conductor may have a triangular shape whose two sides have different lengths.

A wireless communication device according to another aspect of the present disclosure includes the antenna unit and a feed circuit that supplies power to the feed point of the antenna unit.

Such an aspect enables an antenna unit communicating in a higher frequency band having wide band width to communicate also in a lower frequency band while suppressing an increase in the size of the antenna unit.

Hereinafter, embodiments of the present disclosure will be described with reference to the drawings.

Embodiment 1

Figure 2:
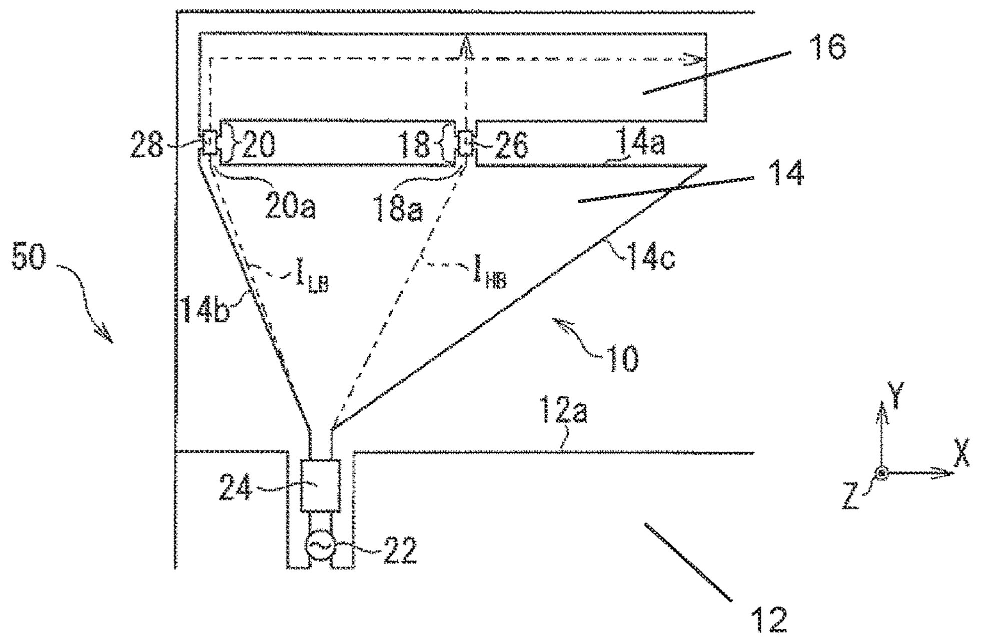
FIG. 2 is a partially enlarged view of the wireless communication device.

FIG. 1 is a top view of a wireless communication device including an antenna unit according to an embodiment 1 of the present disclosure. Further, FIG. 2 is a partially enlarged view of the wireless communication device. Note that the X-Y-Z orthogonal coordinate illustrated in the drawings is provided to facilitate understanding of the present disclosure and is not intended to limit the present disclosure. Further, in the present specification, the X-axis direction is the width direction, and the Y-axis direction is the length direction.

As illustrated in FIG. 1, a wireless communication device 50 including an antenna unit 10 according to the present embodiment 1 is used by being installed in an electronic device capable of wireless communication. Further, the antenna unit 10 is a dual-band antenna unit capable of communicating at a frequency of a relatively high frequency band (HB band) and a frequency of a relatively low frequency band (LB band). In the case of the present embodiment 1, the high frequency band is a 5 GHz band (for example, 5.15 to 5.85 GHz), and the low frequency band is a 2.4 GHz band (for example, 2.4 to 2.484 GHz). Further, the high frequency band has a wider band width compared with the low frequency band.

As illustrated in FIG. 1, in the case of the present embodiment 1, the antenna unit 10 includes a ground conductor 12 provided on a base board 52 of the wireless communication device 50, a first antenna conductor 14 and a second antenna conductor 16 connected to the ground conductor 12 provided on the base board 52, and a first connection part 18 and a second connection part 20 that connect the first antenna conductor 14 and the second antenna conductor 16.

Further, in the case of the present embodiment 1, the antenna unit 10 includes a feed point 22 and a matching circuit 24 that are provided between the ground conductor 12 and the first antenna conductor 14. Note that a feed circuit (not illustrated) provided in the wireless communication device 50 is connected to this feed point 22. The antenna unit 10 receives power from the feed circuit via the feed point 22. Further, the matching circuit 24 is, for example, a LC resonant circuit including a chip inductor and a chip capacitor.

In the case of the present embodiment 1, the ground conductor 12 of the antenna unit 10 has a rectangular shape and is, for example, a conductor pattern of copper or the like formed on the base board 52 fabricated from an insulating material.

In the case of the present embodiment 1, the first antenna conductor 14 and the second antenna conductor 16 of the antenna unit 10 are, for example, conductor patterns of copper or the like formed on the base board 52.

The first antenna conductor 14 has a shape extending from the feed point 22 in a direction (Y-axis direction) moving away from the ground conductor 12 and having the width (size in X-axis direction) that expands as the distance from the feed point 22 increases.

Specifically, the first antenna conductor 14 extends from the feed point 22 in the length direction (Y-axis direction) in such a manner as to move away from an end edge 12*a* of the ground conductor 12 in which the feed point 22 is provided. Further, the width (size in X-axis direction) expands linearly as the distance from the feed point 22 increases, that is to say, the width (size in X-axis direction) expands linearly as the distance to a top end edge 14*a* which is an edge of a distal end portion away from the feed point 22 decreases. In the case of the present embodiment 1, the first antenna conductor 14 has a triangular shape whose base is the top end edge 14*a* and whose two sides 14*b* and 14*c* have different lengths. Further, the top end edge 14*a* of the first antenna conductor 14 is linear and extends in the width direction (X-axis direction) in parallel to the end edge 12*a* of the ground conductor 12.

The second antenna conductor 16 is provided in such a manner as to face the top end edge 14*a* of the first antenna conductor 14 with a gap formed therebetween.

Specifically, the second antenna conductor 16 is arranged in such a manner as to face the top end edge 14*a* of the first antenna conductor 14 with the gap formed therebetween in the length direction (Y-axis direction). Further, in the case of the present embodiment 1, the second antenna conductor 16 has a rectangular shape that extends in the length direction (Y-axis direction) while maintaining the width (size in X-axis direction) equal to the length of the top end edge 14*a* of the first antenna conductor 14. The second antenna conductor 16 having such rectangular shape has the length (size in Y-axis direction) smaller than the width (size in X-axis direction).

The first connection part 18 connects the first antenna conductor 14 and the second antenna conductor 16 via a capacitor. In the case of the present embodiment 1, the first connection part 18 connects the first antenna conductor 14 and the second antenna conductor 16 via a chip capacitor 26 having a desired capacitance. Note that instead of the chip capacitor 26, a capacitor may be formed by using a gap formed between a protruding part that protrudes from the first antenna conductor 14 toward the second antenna conductor 16 and a protruding part that protrudes from the second antenna conductor 16 toward the first antenna conductor 14.

The second connection part 20 connects the first antenna conductor 14 and the second antenna conductor 16 via an inductor. In the case of the present embodiment 1, the second connection part 20 connects the first antenna conductor 14 and the second antenna conductor 16 via a chip inductor 28 having a desired inductance. Note that instead of the chip inductor 28, the first antenna conductor 14 and the second antenna conductor 16 may be connected via a conductor pattern having a shape (for example, a meander shape) that has a desired inductance. Alternatively, instead of the chip inductor 28, the second connection part 20 may connect the first antenna conductor 14 and the second antenna conductor 16 via a zero-ohm resistor.

Further, the first connection part 18 and the second connection part 20 are provided between the first antenna conductor 14 and the second antenna conductor 16 in such a way that a connection point (first connection point) 18*a* between the first connection part 18 and the first antenna conductor is closer to the center of the top end edge 14*a* of the first antenna conductor 14 compared with a connection point (second connection point) 20*a* between the second connection part 20 and the first antenna conductor.

In the case of the present embodiment 1, the connection point 18*a* between the first connection part 18 and the first antenna conductor 14 is positioned at the center of the top end edge 14*a* of the first antenna conductor 14. In contrast, the connection point 20*a* between the second connection part 20 and the first antenna conductor 14 is positioned at one end of the top end edge 14*a* of the first antenna conductor 14.

According to the antenna unit 10 such as this, as illustrated in FIG. 2, in the case where communication is performed at a frequency in the high frequency band (5 GHz band), a current $I_{HB}$ flows from the feed point 22 along a width center part of the first antenna conductor 14 toward the first connection part 18, then flows through the first connection part 18, and flows in the second antenna conductor 16 in the length direction (Y-axis direction). This current path is formed because, for a relatively high frequency current, it is easier to flow through the capacitor (chip capacitor 26) in the first connection part 18 compared with the inductor (chip inductor 28) in the second connection part 20. The path length of this current $I_{HB}$ substantially corresponds to ¼ of wavelength of a frequency in the high frequency band.

On the other hand, in the case where communication is performed at a frequency in the low frequency band (2.4 GHz band), a current $I_{LB}$ flows from the feed point 22 along the side 14*b* of the first antenna conductor 14 toward the second connection part 20, then flows through the second connection part 20, and flows in the second antenna conductor 16 in the width direction (X-axis direction). This current path is formed because, for a relatively low frequency current, it is easier to flow through the inductor (chip inductor 28) of the second connection part 20 compared with the capacitor (chip capacitor 26) of the first connection part 18. The path length of this current $I_{LB}$ substantially corresponds to ¼ of wavelength of a frequency in the low frequency band.

Advantageous effects of the antenna unit 10 having such configuration are now described. Table 1 describes efficiencies of the antenna unit 10 according to the present embodiment 1.

TABLE 1

| | Average Band Width Efficiency (dB) | |
|---|---|---|
| Frequency Band | LB | HB |
| Working Example 1 | −0.7 | −0.9 |
| Comparative Example | −2.2 | −0.4 |

Table 1 describes the average band width efficiency in a frequency band ranging from 2.4 to 2.484 GHz (LB band) and the average band width efficiency in a frequency band ranging from 5.15 to 5.85 GHz (HB band) of the antenna unit 10 (working example 1) according to the present embodiment 1.

As illustrated in FIG. 1, the mounting area of the first antenna conductor 14 and the second antenna conductor 16 of the antenna unit 10 of the working example 1 is an area having a length L1 of 9.5 mm and a width W1 of 11.5 mm. For reference, the base board has a length L2 of 35 mm and a width W2 of 25 mm. Further, the capacitance of the chip capacitor 26 of the first connection part 18 is 0.1 pF, and the inductance of the chip inductor 28 of the second connection part 20 is 1.1 nH.

Further, for reference, Table 1 describes the average band width efficiency in the LB band and the average band width efficiency in the HB band of an antenna unit of a comparative example.

Figure 3:
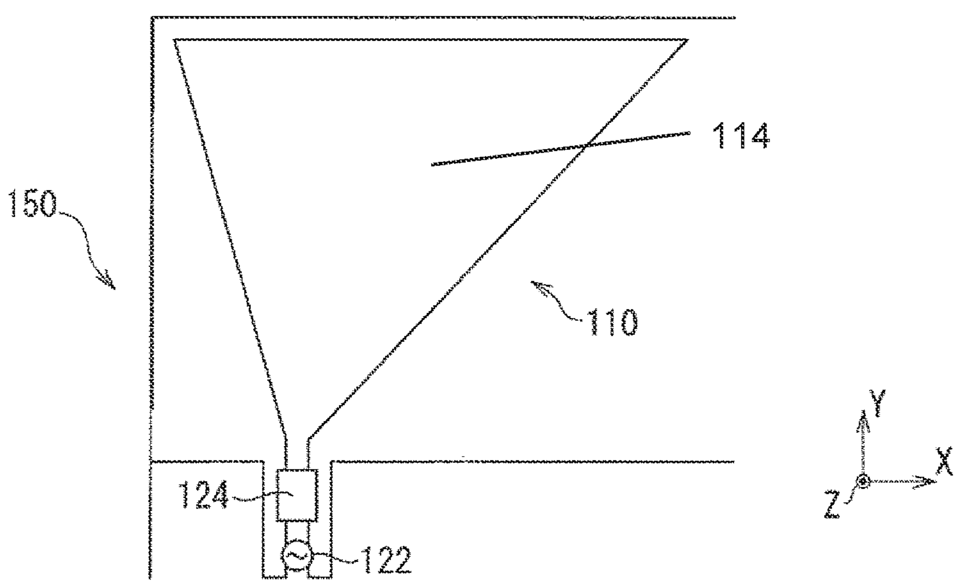
FIG. 3 is a partially enlarged view of a wireless communication device including an antenna unit of a comparative example.

FIG. 3 is a partially enlarged view of a wireless communication device including the antenna unit of the comparative example.

As illustrated in FIG. 3, an antenna unit 110 of a wireless communication device 150 of the comparative example includes an antenna conductor 114 having a triangular shape whose width expands as the distance from a feed point 122 increases. The footprint of the antenna conductor 114 is substantially equal to the footprint of the first antenna conductor 14 and the second antenna conductor 16 of the antenna unit 10 according to the present embodiment 1 (working example 1). Further, the antenna unit 110 of the comparative example includes a matching circuit 124 that provides matching between the feed point 122 and the antenna conductor 114 in a low frequency band LB and a high frequency band HB, which are similar to those in the antenna unit 10 of the working example 1.

Figure 4:
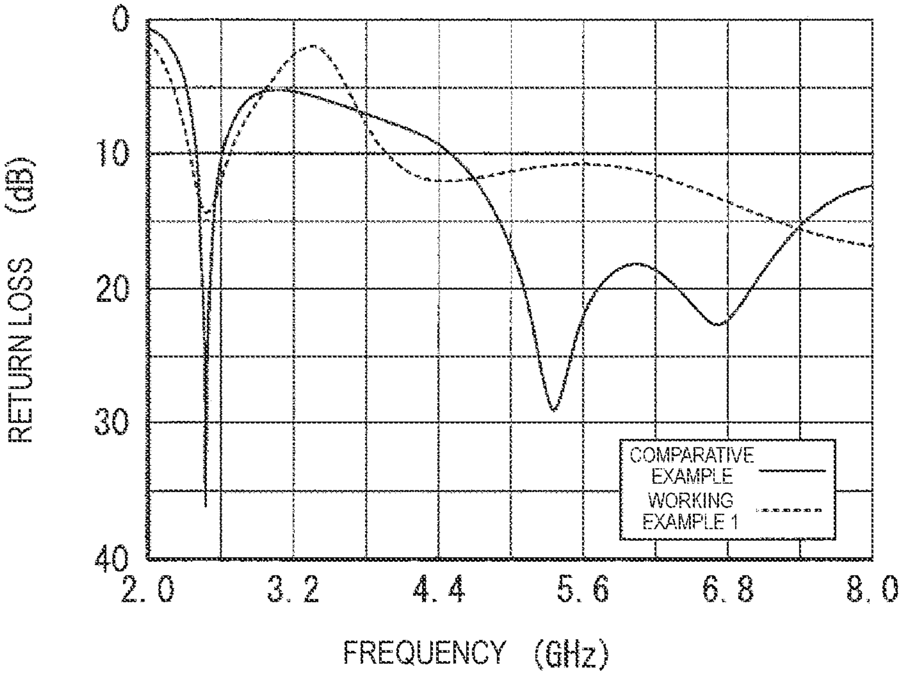
FIG. 4 is a diagram illustrating frequency characteristics (matching completed) of return loss of the antenna unit according to the embodiment 1 (working example 1) and the antenna unit of the comparative example.

FIG. 4 illustrates frequency characteristics (matching completed) of return loss of the antenna unit according to the embodiment 1 (working example 1) and the antenna unit of the comparative example.

As illustrated in FIG. 4, in both the antenna unit 10 of the working example 1 (dashed line) and the antenna unit 110 of the comparative example (solid line), in the range where the return loss is at a practical level of 10 dB or higher, the matching is provided in both the low frequency band LB and the high frequency band HB.

As described in Table 1 described above, the antenna unit 110 of the comparative example has a higher average efficiency value compared with −1.0 dB (practical level) in the high frequency band HB, and thus has a favorable efficiency. However, in the low frequency band LB, the average efficiency value is −2.2 dB and thus unfavorable.

On the other hand, in the case of the working example 1, the average efficiencies in the high frequency band HB and the low frequency band LB are both higher than −1.0 dB. Accordingly, the antenna unit 10 of the working example 1 has favorable efficiency because the efficiency is high in both the high frequency band HB and the low frequency band LB.

Accordingly, by dividing the antenna conductor 114 of the comparative example capable of communicating in the high frequency band having wide band width into the first antenna conductor 14 and the second antenna conductor 16 such as the ones described in the working example 1 and connecting these using the first connection part 18 and the second connection part 20, it becomes possible to achieve favorable efficiency in both the high frequency band and the low frequency band without necessarily substantially expanding the footprint of the antenna conductor.

The present embodiment 1 described above enables an antenna unit communicating in a higher frequency band having wide band width to communicate also in a lower frequency band while suppressing an increase in the size of the antenna unit.

Embodiment 2

The present embodiment 2 is an improved embodiment of the foregoing embodiment 1. Accordingly, the present embodiment 2 is described, focusing on points different from the foregoing embodiment 1. Note that the same reference symbol is given to the constituent element of the present embodiment 2 that is substantially identical to the constituent element of the foregoing embodiment 1.

Figure 5:
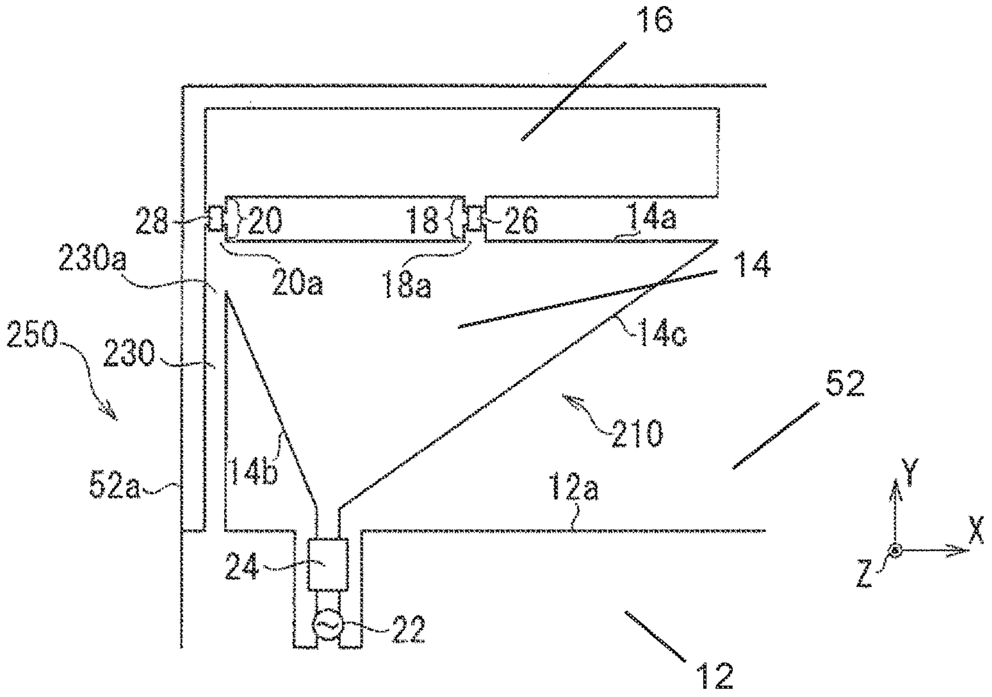
FIG. 5 is a partially enlarged view of a wireless communication device including an antenna unit according to an embodiment 2 of the present disclosure.

FIG. 5 is a partially enlarged view of a wireless communication device including an antenna unit according to the embodiment 2 of the present disclosure.

As illustrated in FIG. 5, in an antenna unit 210 of a wireless communication device 250 according to the present embodiment 2, in addition to be connected to the ground conductor 12 via the feed point 22, the first antenna conductor 14 is connected to the ground conductor 12 via a short-circuit conductor 230. That is to say, the first antenna conductor 14 is short-circuited to the ground conductor 12 via the short-circuit conductor 230.

Specifically, the short-circuit conductor 230 is a conductor having one end portion connected to the first antenna conductor 14 and the other end portion connected to the ground conductor 12. Further, a connection point (third connection point) 230*a* between the short-circuit conductor 230 and the first antenna conductor 14 is away from the connection point (first connection point) 18*a* between the first connection part 18 and the first antenna conductor 14 and is closer to the connection point (second connection point) 20*a* between the second connection part 20 and the first antenna conductor 14. That is to say, in the case of the present embodiment 2, the ground conductor 12, the first antenna conductor 14, and the short-circuit conductor 230 are unified as a single constituent element (for example, a single conductor pattern). Note that the connection point 20*a* and the connection point 230*a* can be closer to each other as in the present embodiment 2.

Figure 6:
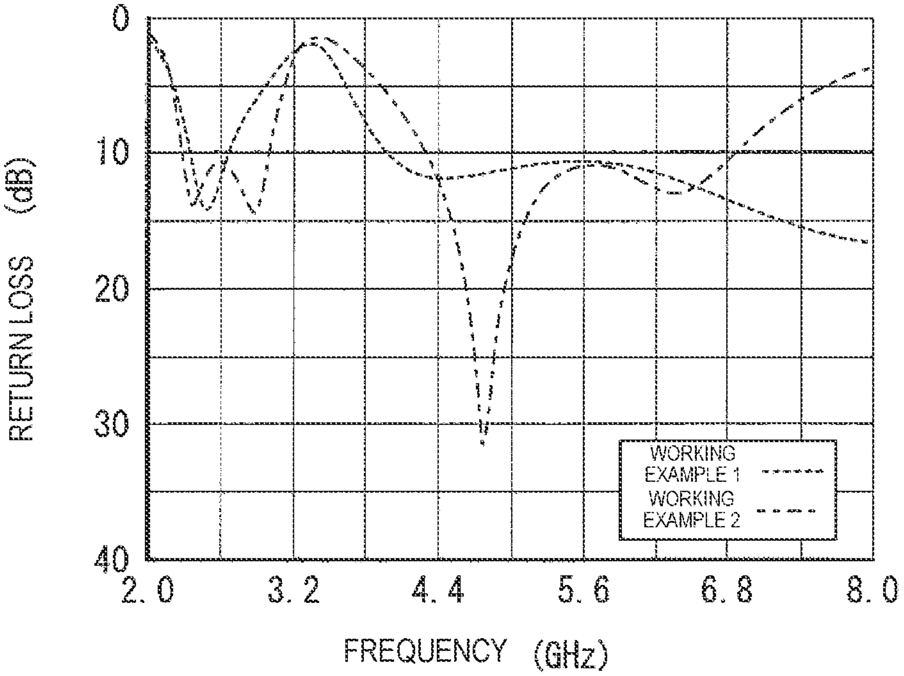
FIG. 6 is a diagram illustrating frequency characteristics of return loss (matching completed) of the antenna unit according to the embodiment 1 (working example 1) and the antenna unit according to the embodiment 2 (working example 2).

FIG. 6 is a diagram illustrating frequency characteristics of return loss (matching completed) of the antenna unit according to the embodiment 1 (working example 1) and the antenna unit according to the embodiment 2 (working example 2).

As illustrated in FIG. 6, by providing the short-circuit conductor 230 (working example 2), in the range where the return loss is at a practical level of 10 dB or higher, the band width of the low frequency band expands about twofold. This is because, in frequencies of the low frequency band, the antenna unit 10 of the foregoing embodiment 1 (working example 1) functions as a monopole antenna while the antenna unit 210 of the present embodiment (working example 2) functions as an inverted-F antenna.

Note that as described in Table 2, even when the band width of the low frequency band expands, the efficiency does not change drastically. As is the case with the foregoing embodiment 1 (working example 1), also in the present embodiment 2 (working example 2), it becomes possible to achieve favorable efficiency in both the high frequency band and the low frequency band.

TABLE 2

| | Average Band Width Efficiency (dB) | |
|---|---|---|
| Frequency Band | LB | HB |
| Working Example 2 | −1.0 | −1.0 |
| Working Example 1 | −0.7 | −0.9 |

Further, as illustrated in FIG. 5, the short-circuit conductor 230 can be arranged in such a manner as to extend along an end edge 52*a* of the base board 52 fabricated from an insulating material. Such arrangement of the short-circuit conductor 230 facilitates flowing of a current into part of the ground conductor 12 along the end edge 52*a* of the base board 52 in the case of the low frequency band. As a result, compared with the case where the short-circuit conductor 230 is provided at a location away from the end edge 52*a* of the base board 52, in the low frequency band, the efficiency increases as the band width thereof expands.

As is the case with the foregoing embodiment 1, the present embodiment 2 described above enables an antenna unit communicating in a higher frequency band having wide band width to communicate also in a lower frequency band while suppressing an increase in the size of the antenna unit. Further, it becomes possible to expand the band width of the lower frequency band.

Embodiment 3

The present embodiment 3 is an improved embodiment of the foregoing embodiment 2. Accordingly, the present embodiment 3 is described, focusing on points different from the foregoing embodiment 2. Note that the same reference symbol is given to the constituent element of the present embodiment 3 that is substantially identical to the constituent element of the foregoing embodiment 2.

Figure 7:
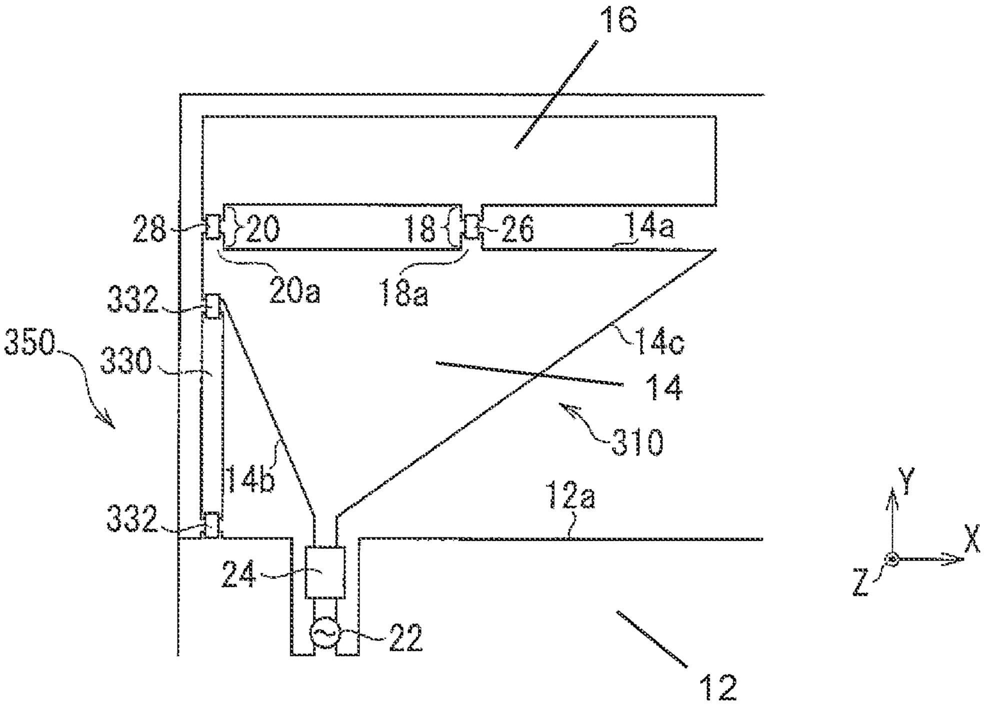
FIG. 7 is a partially enlarged view of a wireless communication device including an antenna unit according to an embodiment 3 of the present disclosure.

FIG. 7 is a partially enlarged view of a wireless communication device including an antenna unit according to the embodiment 3 of the present disclosure.

As illustrated in FIG. 7, in an antenna unit 310 of a wireless communication device 350 according to the present embodiment 3, the first antenna conductor 14 is short-circuited to the ground conductor 12 via a short-circuit conductor 330. However, the short-circuit conductor 330 is an independent conductor different from the ground conductor 12 and the first antenna conductor 14. Therefore, one end portion of the short-circuit conductor 330 is connected to the first antenna conductor 14 via an inductor, for example, a chip inductor 332, and the other end portion of the short-circuit conductor 330 is connected to the ground conductor 12 via a chip inductor 332. In the case of the present embodiment 3, the chip inductor 332, which is arranged between the short-circuit conductor 330 and the ground conductor 12, and the chip inductor 332, which is arranged between the short-circuit conductor 330 and the first antenna conductor 14, have the same inductance. Note that two chip inductors 332 may have different inductances.

Figure 8:
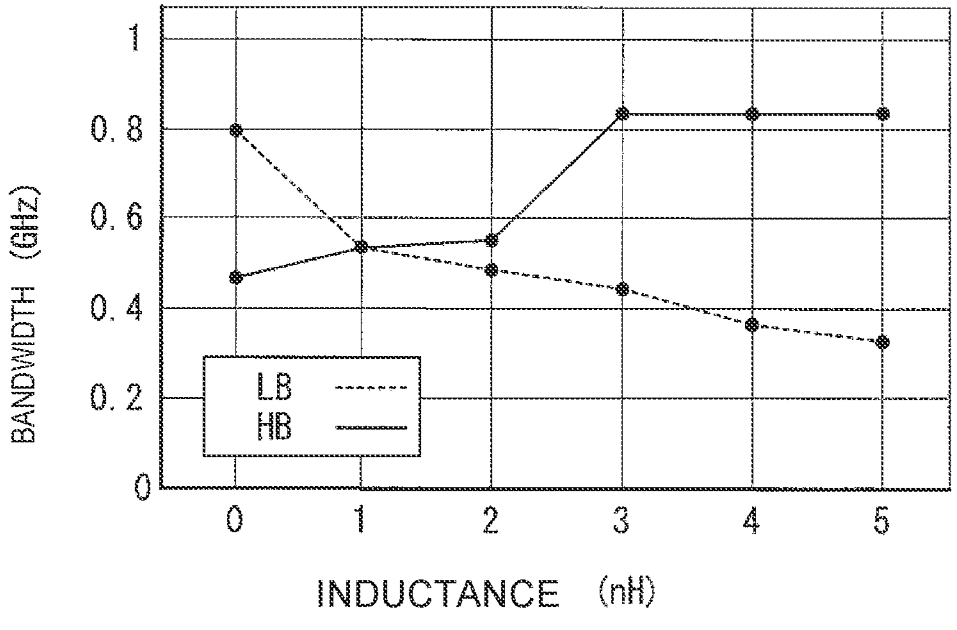
FIG. 8 is a diagram illustrating relationships between the band width of frequency band and the inductor's inductance value for an inductor arranged between a short-circuit conductor and a ground conductor and an inductor arranged between the short-circuit conductor and a first antenna conductor.

FIG. 8 is a diagram illustrating relationships between the band width of frequency band and the inductor's inductance value for the inductor arranged between the short-circuit conductor and the ground conductor and the inductor arranged between the short-circuit conductor and the first antenna conductor.

As illustrated in FIG. 8, the band width of a high frequency band (HB band) expands as the inductance of the chip inductor 332 increases. Accordingly, by adjusting the inductance of the chip inductor 332, it becomes possible to have a desired band width in the high frequency band.

Note that instead of using the connection via the chip inductors 332, one end portion and the other end portion of the short-circuit conductor 330 may be changed in such a manner as to have different widths from the width of the part between the one end portion and the other end portion, that is to say, may be configured in such a manner as to have desired inductances, and the one end portion and the other end portion of the short-circuit conductor 330 that have been changed may be connected to the ground conductor 12 and the first antenna conductor 14.

As is the case with the foregoing embodiment 2, the present embodiment 3 described above enables an antenna unit communicating in a higher frequency band having wide band width to communicate also in a lower frequency band while suppressing an increase in the size of the antenna unit. Further, it becomes possible to expand the band width of the lower frequency band. Moreover, it also becomes possible to expand the band width of the higher frequency band.

Thus far, the present disclosure has been described using a plurality of the embodiments 1 to 3. However, embodiments of the present disclosure are not limited thereto.

For example, in the case of the foregoing embodiment 1, as illustrated in FIG. 2, the second antenna conductor 16 has a rectangular shape. Specifically, the second antenna conductor 16 has a rectangular shape that extends in the length direction (Y-axis direction) with the width (size in X-axis direction) being a constant state and has the length (size in Y-axis direction) smaller than the width. Further, the width of the second antenna conductor 16 has the dimension equal to the length of the top end edge 14*a* of the first antenna conductor 14. However, in embodiments of the present disclosure, the shape of the second antenna conductor is not limited to a rectangular shape.

Each of FIG. 9 to FIG. 13 is a partially enlarged view of a wireless communication device including an antenna unit according to embodiments 4 to 8 of the present disclosure.

Figure 9:
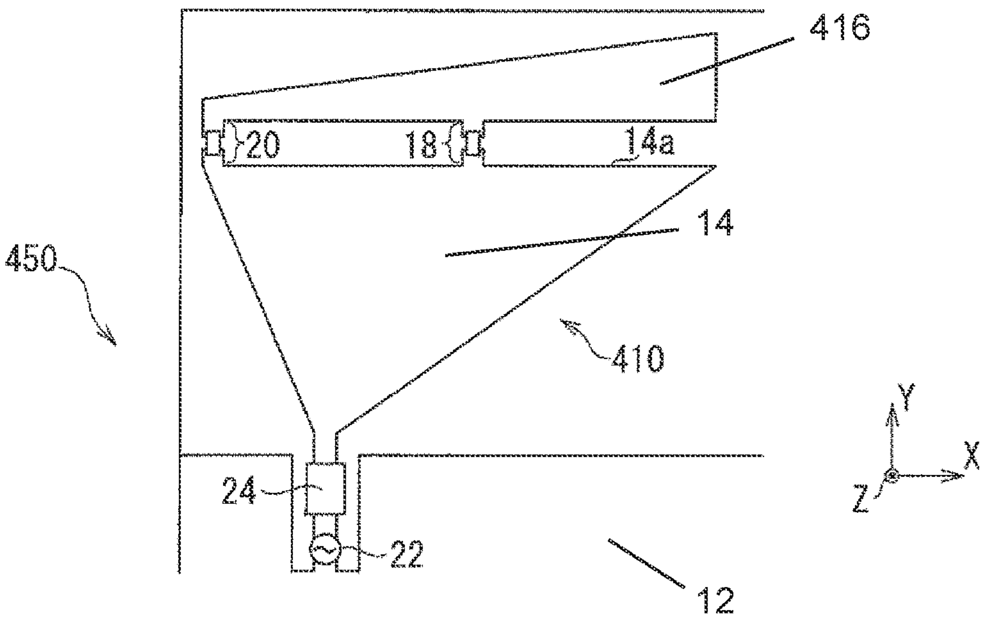
FIG. 9 is a partially enlarged view of a wireless communication device including an antenna unit according to an embodiment 4 of the present disclosure.

As illustrated in FIG. 9, a second antenna conductor 416 of an antenna unit 410 of a wireless communication device 450 according to the embodiment 4 has a shape whose length (size in Y-axis direction) increases as the distance from the second connection part 20 in the width direction (X-axis direction) increases. Note that the width (size in X-axis direction) of the second antenna conductor 416 is equal to the length of the top end edge 14*a* of the first antenna conductor 14.

Figure 10:
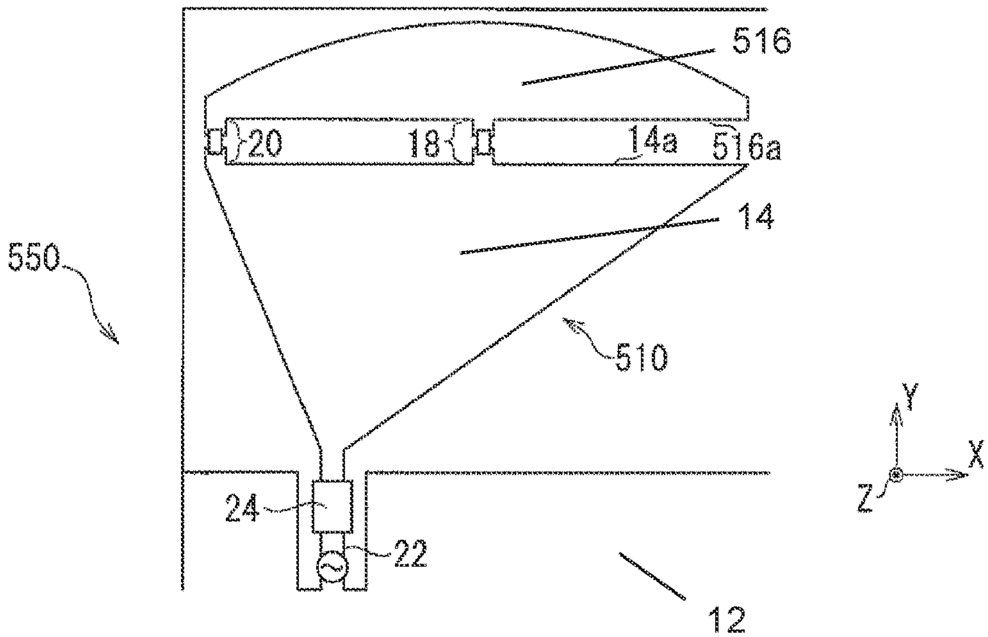
FIG. 10 is a partially enlarged view of a wireless communication device including an antenna unit according to an embodiment 5 of the present disclosure.

Further, as illustrated in FIG. 10, a second antenna conductor 516 of an antenna unit 510 of a wireless communication device 550 according to the embodiment 5 has a shape that has a greater length (size in Y-axis direction) at the center in the width direction (X-axis direction) compared with the lengths at both ends thereof. Note that a back end edge 516*a* of the second antenna conductor 516, which faces the top end edge 14*a* of the first antenna conductor 14, is linear and in parallel to the top end edge 14*a*. Further, the width (size in X-axis direction) of the second antenna conductor 516 is equal to the length of the top end edge 14*a* of the first antenna conductor 14.

Figure 11:
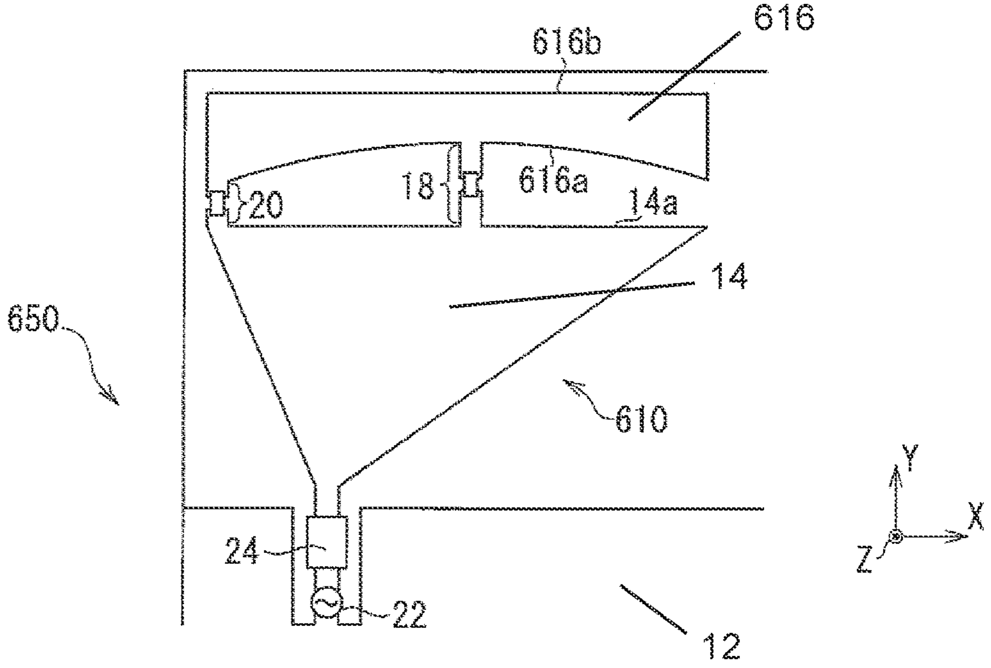
FIG. 11 is a partially enlarged view of a wireless communication device including an antenna unit according to an embodiment 6 of the present disclosure.

Moreover, as illustrated in FIG. 11, a second antenna conductor 616 of an antenna unit 610 of a wireless communication device 650 according to the embodiment 6 has a shape that has a smaller length (size in Y-axis direction) at the center in the width direction (X-axis direction) compared with the lengths at both ends thereof. Note that a top end edge 616*b* of the second antenna conductor 616, which is the opposite side of a back end edge 616*a* of the second antenna conductor 616 that faces the top end edge 14*a* of the first antenna conductor 14, is linear and in parallel to the top end edge 14*a* of the first antenna conductor 14. Further, the width (size in X-axis direction) of the second antenna conductor 616 is equal to the length of the top end edge 14*a* of the first antenna conductor 14.

As is the case with the foregoing embodiment 1, the embodiments 4 to 6 such as those enable an antenna unit communicating in a higher frequency band having wide band width to communicate also in a lower frequency band while suppressing an increase in the size of the antenna unit.

Figure 12:
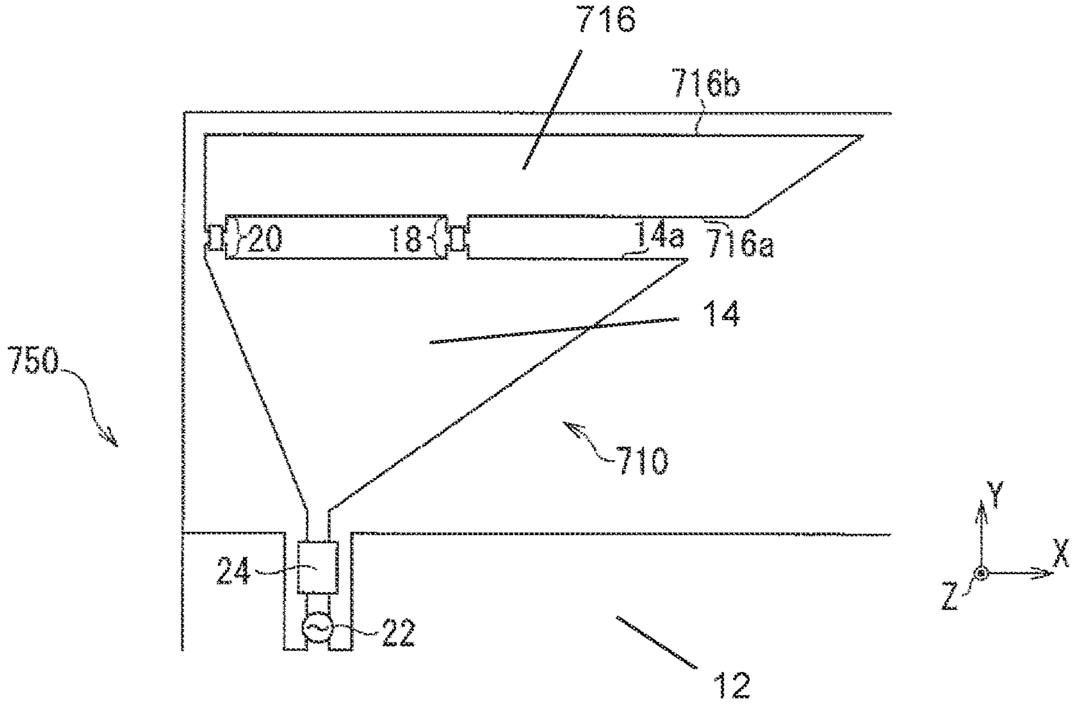
FIG. 12 is a partially enlarged view of a wireless communication device including an antenna unit according to an embodiment 7 of the present disclosure.

Still further, as illustrated in FIG. 12, a second antenna conductor 716 of an antenna unit 710 of a wireless communication device 750 according to the embodiment 7 has a trapezoidal shape in which a back end edge 716*a* and a top end edge 716*b* are in parallel to each other and the length of the back end edge 716*a* is greater than the length of the top end edge 716*b*. The back end edge 716*a* has a greater length than the top end edge 14*a* of the first antenna conductor 14.

As is the case with the foregoing embodiment 1, the embodiment 7 such as this enables an antenna unit communicating in a higher frequency band having wide band width to communicate also in a lower frequency band while suppressing an increase in the size of the antenna unit. Moreover, it becomes possible to expand the band width of the higher frequency band.

Figure 13:
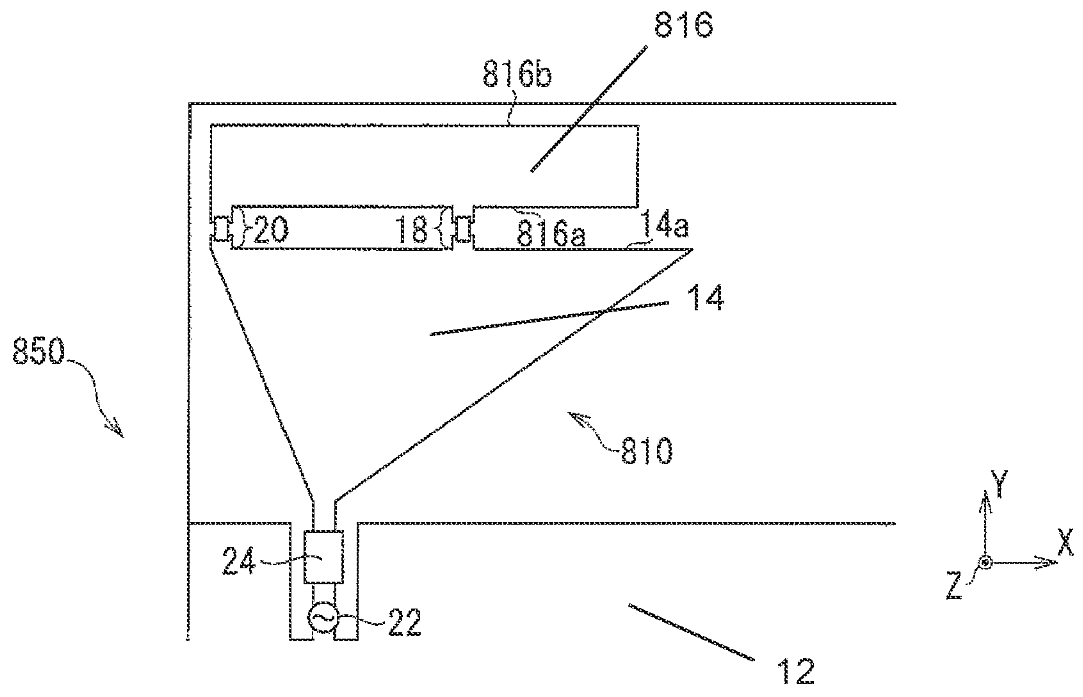
FIG. 13 is a partially enlarged view of a wireless communication device including an antenna unit according to an embodiment 8 of the present disclosure.

As illustrated in FIG. 13, a second antenna conductor 816 of an antenna unit 810 of a wireless communication device 850 according to the embodiment 8 is different from that of the antenna unit 710 according to the embodiment 7 in that the second antenna conductor 816 has a rectangular shape in which a back end edge 816*a* and a top end edge 816*b* are parallel to each other and have an equal length. The length of the back end edge 816*a* and the top end edge 816*b* is smaller than the length of the top end edge 14*a* of the first antenna conductor 14.

As is the case with the foregoing embodiment 1, the embodiment 8 such as this also enables an antenna unit communicating in a higher frequency band having wide band width to communicate also in a lower frequency band while suppressing an increase in the size of the antenna unit.

Further, for example, in the case of the foregoing embodiment 1, as illustrated in FIG. 2, the first antenna conductor 14 has a triangular shape whose base is the top end edge 14*a*. However, in embodiments of the present disclosure, the shape of the first antenna conductor is not limited to a triangular shape.

Figure 14:
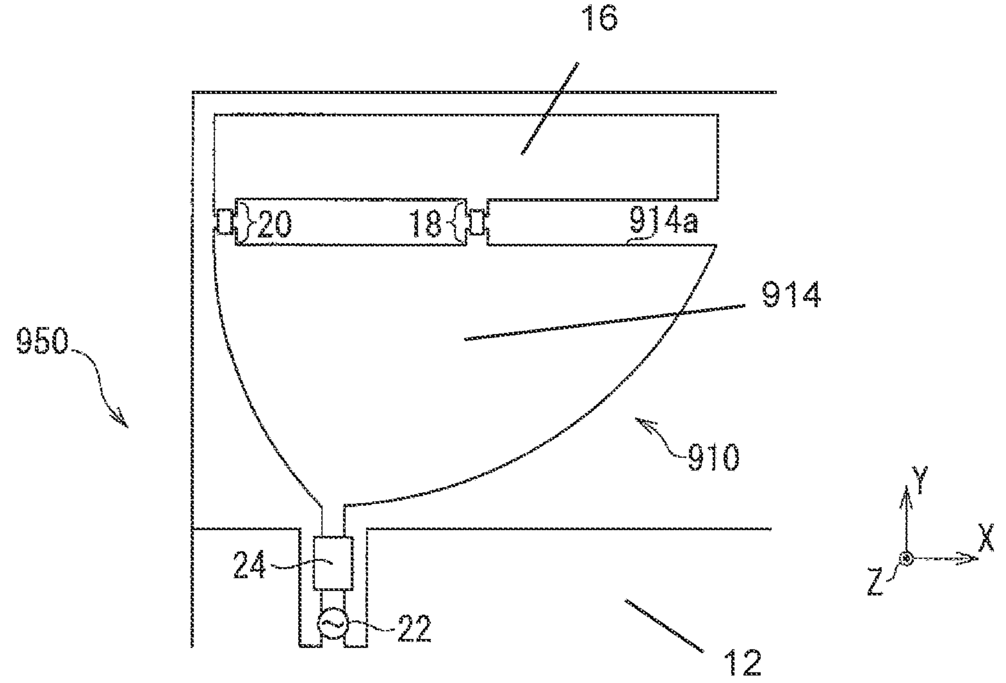
FIG. 14 is a partially enlarged view of a wireless communication device including an antenna unit according to an embodiment 9 of the present disclosure.
Figure 15:
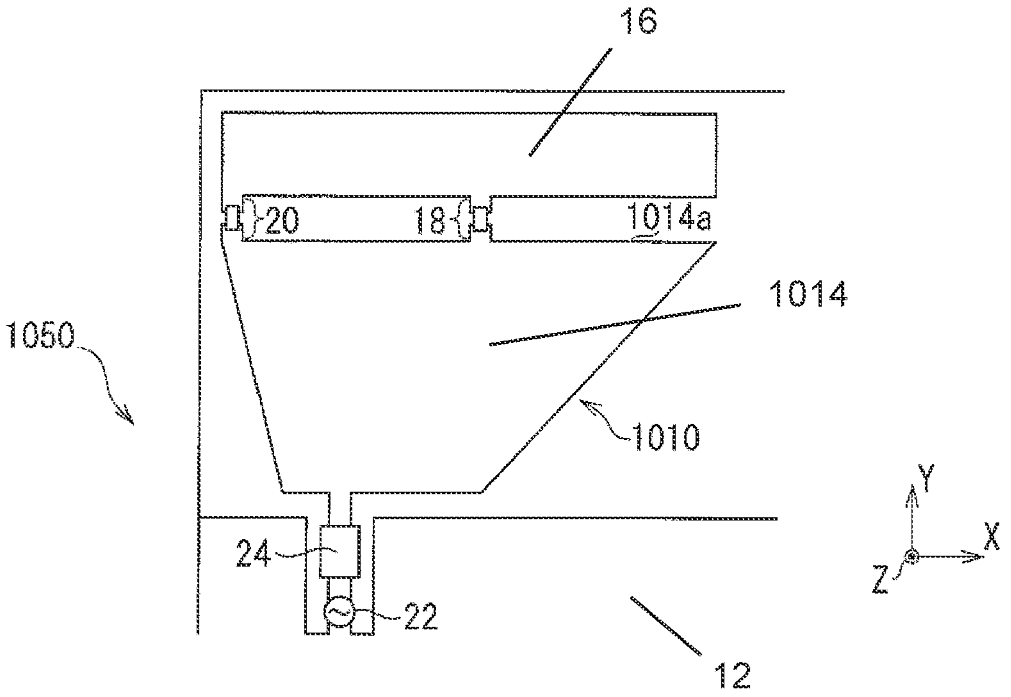
FIG. 15 is a partially enlarged view of a wireless communication device including an antenna unit according to an embodiment 10 of the present disclosure.

FIG. 14 and FIG. 15 are partially enlarged views of wireless communication devices including antenna units according to embodiments 9 and 10 of the present disclosure, respectively.

As illustrated in FIG. 14, a first antenna conductor 914 of an antenna unit 910 of a wireless communication device 950 according to the embodiment 9 has a so-called bowl shape which is a shape that extends from the feed point 22 in a direction (Y-axis direction) away from the ground conductor 12 and has the width (size in X-axis direction) that expands in a quadratic fashion as the distance from the feed point 22 increases.

Further, as illustrated in FIG. 15, a first antenna conductor 1014 of an antenna unit 1010 of a wireless communication device 1050 according to the embodiment 10 has a so-called trapezoidal shape which is a shape that extends from the feed point 22 in a direction (Y-axis direction) away from the ground conductor 12 and has the width (size in X-axis direction) that expands in a linear fashion as the distance from the feed point 22 increases.

As is the case with the foregoing embodiment 1, the embodiments 9 and 10 also enable an antenna unit communicating in a higher frequency band having wide band width to communicate also in a lower frequency band while suppressing an increase in the size of the antenna unit.

Moreover, in the case of the foregoing embodiment 1, as illustrated in FIG. 2, the first antenna conductor 14 extends from the feed point 22 in the direction away from the ground conductor 12. However, embodiments of the present disclosure is not limited thereto. For example, as in a self-complementary antenna such as a bow-tie antenna or the like, while extending the first antenna conductor from the feed point, another antenna conductor may extend from the feed point in the opposite direction.

That is to say, an antenna unit according to an embodiment of the present disclosure is, in a broader sense, an antenna unit including a feed point; a first antenna conductor extending from the feed point in a direction away from the ground conductor and having a width that expands as a distance from the feed point increases; a second antenna conductor facing a top end edge of the first antenna conductor with a gap formed therebetween; a first connection part connecting the top end edge of the first antenna conductor and the second antenna conductor via a capacitor; and a second connection part connecting the top end edge of the first antenna conductor and the second antenna conductor via an inductor or a zero-ohm resistor, wherein a first connection point between the first connection part and the first antenna conductor is closer to a center of the top end edge of the first antenna conductor compared with a second connection point between the second connection part and the first antenna conductor.

Thus far, the present disclosure has been described using a plurality of embodiments. However, it is apparent to those skilled in the art that still another embodiment according to the present disclosure may be formed by combining an embodiment and part or whole of at least one other embodiment.

INDUSTRIAL APPLICABILITY

The present disclosure is applicable to dual-band antenna units.

The invention claimed is:

1. An antenna unit comprising:
- a feed point;
- a first antenna conductor extending from the feed point and having a width that increases as a distance from the feed point increases;
- a second antenna conductor facing a top end edge of the first antenna conductor with a gap between the first antenna conductor and the second antenna conductor;
- a first connection point connecting the top end edge of the first antenna conductor to the second antenna conductor via a capacitor; and
- a second connection point connecting the top end edge of the first antenna conductor to the second antenna conductor via a first inductor or a zero-ohm resistor,
- wherein the first connection point is closer to a center of the top end edge of the first antenna conductor than the second connection point,
- wherein the first connection point is at the center of the top end edge of the first antenna conductor, and
- the second connection point is at one end of the top end edge of the first antenna conductor.

2. The antenna unit according to claim 1, wherein a width of the second antenna conductor is equal to or greater than a length of the top end edge.

3. A wireless communication device comprising:
- the antenna unit according to claim 1; and
- a feed circuit configured to supply power to the feed point of the antenna unit.

4. An antenna unit comprising:
- a feed point;
- a first antenna conductor extending from the feed point and having a width that increases as a distance from the feed point increases;
- a second antenna conductor facing a top end edge of the first antenna conductor with a gap between the first antenna conductor and the second antenna conductor;
- a first connection point connecting the top end edge of the first antenna conductor to the second antenna conductor via a capacitor;
- a second connection point connecting the top end edge of the first antenna conductor to the second antenna conductor via a first inductor or a zero-ohm resistor, wherein the first connection point is closer to a center of the top end edge of the first antenna conductor than the second connection point;
- a ground conductor connected to the feed point, wherein the first antenna conductor extends away from the ground conductor; and
- a short-circuit conductor, a first end portion of the short-circuit conductor being connected to the first antenna conductor, and a second end portion of the short-circuit conductor being connected to the ground conductor, wherein a third connection point between the short-circuit conductor and the first antenna conductor is closer to the second connection point than to the first connection point.

5. The antenna unit according to claim 4, wherein:

the first end portion of the short-circuit conductor is connected to the first antenna conductor via a second inductor, and the second end portion of the short-circuit conductor is connected to the ground conductor via a third inductor.

6. A wireless communication device comprising:

the antenna unit according to claim 4; and a feed circuit configured to supply power to the feed point of the antenna unit.

7. An antenna unit comprising:

a feed point;

a first antenna conductor extending from the feed point and having a width that increases as a distance from the feed point increases;

a second antenna conductor facing a top end edge of the first antenna conductor with a gap between the first antenna conductor and the second antenna conductor;

a first connection point connecting the top end edge of the first antenna conductor to the second antenna conductor via a capacitor; and a second connection point connecting the top end edge of the first antenna conductor to the second antenna conductor via a first inductor or a zero-ohm resistor, wherein the first connection point is closer to a center of the top end edge of the first antenna conductor than the second connection point, wherein:

the first antenna conductor has a triangular shape whose base is the top end edge, and the second antenna conductor has a rectangular shape.

8. The antenna unit according to claim 7, wherein the first antenna conductor has a triangular shape whose two sides other than the base have different lengths.

9. A wireless communication device comprising:

the antenna unit according to claim 7; and a feed circuit configured to supply power to the feed point of the antenna unit.

* * * * *